United States Patent
Sathyanarayanamurthy et al.

(10) Patent No.: US 12,185,420 B2
(45) Date of Patent: Dec. 31, 2024

(54) PROBLEM MITIGATION IN SUBSCRIBER PROFILE MANAGEMENT

(71) Applicant: NOKIA TECHNOLOGIES OY, Espoo (FI)

(72) Inventors: Kiran Sathyanarayanamurthy, Karnataka (IN); Anatoly Andrianov, Schaumburg, IL (US); Olaf Pollakowski, Berlin (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 47 days.

(21) Appl. No.: 17/123,983

(22) Filed: Dec. 16, 2020

(65) Prior Publication Data
US 2022/0046406 A1 Feb. 10, 2022

(30) Foreign Application Priority Data
Aug. 7, 2020 (IN) ............................. 202011033727

(51) Int. Cl.
H04W 8/18 (2009.01)
G06F 16/174 (2019.01)
G06F 16/215 (2019.01)

(52) U.S. Cl.
CPC .......... H04W 8/18 (2013.01); G06F 16/1744 (2019.01); G06F 16/215 (2019.01)

(58) Field of Classification Search
CPC ..... H04W 24/02; H04W 24/04; H04W 24/10; H04W 8/18; G06F 16/1744; G06F 16/215
See application file for complete search history.

(56) References Cited

U.S. PATENT DOCUMENTS 8,170,491 B2 * 5/2012 Shuman ................ H04W 24/08
455/67.11
8,195,750 B1 * 6/2012 Bakhmutov .......... H04L 51/212
709/206
(Continued)

FOREIGN PATENT DOCUMENTS

CN 102656570 A 9/2012
CN 103152775 A 6/2013
(Continued)

OTHER PUBLICATIONS

Extended European Search Report dated Jun. 29, 2021 corresponding to European Patent Application No. 20215205.4.
(Continued)

Primary Examiner — Lester G Kincaid
Assistant Examiner — Dung L Lam
(74) Attorney, Agent, or Firm — SQUIRE PATTON BOGGS (US) LLP

(57) ABSTRACT

Systems, methods, apparatuses, and computer program products for mitigating problems in subscriber profile management. One method may include creating a distribution of subscriber profile sizes. The method may also include collecting a distribution of subscriber profile sizes observed within a pre-defined interval of a network. The method may further include performing an analysis of the distribution. In addition, the method may further include determining a corrective action based on the analysis. Further, the method may include determining whether the corrective action is needed. When it is determined that the corrective action is needed, the method may include applying the corrective
(Continued)

action to the network. When it is determined that the corrective action is not needed, the method may include collecting another distribution of subscriber profile sizes.

15 Claims, 7 Drawing Sheets

(56) References Cited

U.S. PATENT DOCUMENTS

| | | | | |
|---|---|---|---|---|
| 8,468,601 | B1* | 6/2013 | Bakhmutov | H04L 63/1425 |
| | | | | 709/206 |
| 10,452,676 | B2* | 10/2019 | Chen | G06F 16/2462 |
| 2010/0165190 | A1* | 7/2010 | Ohbitsu | H04N 19/132 |
| | | | | 348/E7.003 |
| 2017/0353991 | A1 | 12/2017 | Tapia | |
| 2020/0059399 | A1* | 2/2020 | Higuchi | H04L 43/045 |
| 2020/0145887 | A1* | 5/2020 | Rune | H04W 36/08 |
| 2020/0334095 | A1* | 10/2020 | Xu | G06F 17/18 |
| 2021/0160264 | A1* | 5/2021 | Adir | H04L 63/1425 |

FOREIGN PATENT DOCUMENTS

| | | | | |
|---|---|---|---|---|
| CN | 106664550 | A | 5/2017 | |
| CN | 107925869 | A | 4/2018 | |
| CN | 111095310 | A | 5/2020 | |
| EP | 1146687 | A3 * | 8/2004 | ............ H04L 12/14 |
| KR | 20100078786 | A | 7/2010 | |
| WO | 02/41176 | A1 | 5/2002 | |
| WO | 2010/047988 | A1 | 4/2010 | |

OTHER PUBLICATIONS

3GPP TS 23.288 V16.1.0 (Sep. 2019), Technical Specification, 3rd Generation Partnership Project; Technical Specification Group Services and System Aspects; Architecture enhancements for 5G System (5GS) to support network data analytics services (Release 16), Sep. 24, 2019, pp. 1-52, XP051784663.
3GPP TS 28.552 V16.6.0 (Jul. 2020), Technical Specification, 3rd Generation Partnership Project; Technical Specification Group Services and System Aspects; Management and orchestration; 5G performance measurements (Release 16), Jul. 2020.
ETSI GS ZSM 002 V1.1.1 (Aug. 2019), Group Specification, "Zero-touch network and Service Management (ZSM); Reference Architecture," ETSI, Aug. 2019.
Chinese Office Action issued in corresponding Chinese Patent Application No. 202110138663 on Jul. 2, 2024.
3GPP TSG-WG2 Meeting #44, Budapest, Hungary, Jan. 26-Feb. 2, 2005, S2-050058, 5 pages.

* cited by examiner

PROBLEM MITIGATION IN SUBSCRIBER PROFILE MANAGEMENT

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to apparatuses, systems, and/or methods for mitigating problems in subscriber profile management.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. Fifth generation (5G) wireless systems refer to the next generation (NG) of radio systems and network architecture. 5G is mostly built on a new radio (NR), but the 5G (or NG) network can also build on E-UTRAN radio. It is estimated that NR will provide bitrates on the order of 10-20 Gbit/s or higher, and will support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) are named gNB when built on NR radio and named NG-eNB when built on E-UTRAN radio.

SUMMARY

Some example embodiments are directed to a method. The method may include creating a distribution of subscriber profile sizes. In addition, the method may also include collecting the distribution of subscriber profile sizes observed within a pre-defined interval of a network. The method may also include performing an analysis of the distribution. The method may further include determining a corrective action based on the analysis. In addition, the method may include determining whether the corrective action is needed. When it is determined that the corrective action is needed, the method may include applying the corrective action to the network. When it is determined that the corrective action is not needed, the method may include collecting another distribution of subscriber profile sizes.

Other example embodiments may be directed to an apparatus. The apparatus may include at least one processor and at least one memory including computer program code. The at least one memory and computer program code may be configured to, with the at least one processor, cause the apparatus at least to create a distribution of subscriber profile sizes. In addition, the apparatus may be caused to collect the distribution of subscriber profile sizes observed within a pre-defined interval of a network. The apparatus may also be caused to perform an analysis of the distribution. The apparatus may further be caused to determine a corrective action based on the analysis. In addition, the apparatus may be caused to determine whether the corrective action is needed. When it is determined that the corrective action is needed, the apparatus may be caused to apply the corrective action to the network. When it is determined that the corrective action is not needed, the apparatus may be caused to collect another distribution of subscriber profile sizes.

Other example embodiments may be directed to an apparatus. The apparatus may include means for creating a distribution of subscriber profile sizes. In addition, the apparatus may include means for collecting the distribution of subscriber profile sizes observed within a pre-defined interval of a network. The apparatus may also include means for performing an analysis of the distribution. The apparatus may further include means for determining a corrective action based on the analysis. In addition, the apparatus may include means for determining whether the corrective action is needed. When it is determined that the corrective action is needed, the apparatus may include means for applying the corrective action to the network. When it is determined that the corrective action is not needed, the apparatus may include means for collecting another distribution of subscriber profile sizes.

In accordance with other example embodiments, a non-transitory computer readable medium may be encoded with instructions that may, when executed in hardware, perform a method. The method may include creating a distribution of subscriber profile sizes. In addition, the method may include collecting the distribution of subscriber profile sizes observed within a pre-defined interval of a network. The method may also include performing an analysis of the distribution. The method may further include determining a corrective action based on the analysis. In addition, the method may include determining whether the corrective action is needed. When it is determined that the corrective action is needed, the method may include applying the corrective action to the network. When it is determined that the corrective action is not needed, the method may include collecting another distribution of subscriber profile sizes.

Other example embodiments may be directed to a computer program product that performs a method. The method may include creating a distribution of subscriber profile sizes. In addition, the method may include collecting the distribution of subscriber profile sizes observed within a pre-defined interval of a network. The method may also include performing an analysis of the distribution. The method may further include determining a corrective action based on the analysis. In addition, the method may include determining whether the corrective action is needed. When it is determined that the corrective action is needed, the method may include applying the corrective action to the network. When it is determined that the corrective action is not needed, the method may include collecting another distribution of subscriber profile sizes.

Other example embodiments may be directed to an apparatus that may include circuitry configured to create a distribution of subscriber profile sizes. In addition, the apparatus may include circuitry configured to collect the distribution of subscriber profile sizes observed within a pre-defined interval of a network. The apparatus may also include circuitry configured to perform an analysis of the distribution. The apparatus may further include circuitry configured to determine a corrective action based on the analysis. In addition, the apparatus may include circuitry configured to determine whether the corrective action is needed. When it is determined that the corrective action is needed, the apparatus may include circuitry configured to apply the corrective action to the network. When it is determined that the corrective action is not needed, the apparatus may include circuitry configured to collect another distribution of subscriber profile sizes.

BRIEF DESCRIPTION OF THE DRAWINGS

For proper understanding of example embodiments, reference should be made to the accompanying drawings, wherein.

DETAILED DESCRIPTION

Figure 1:
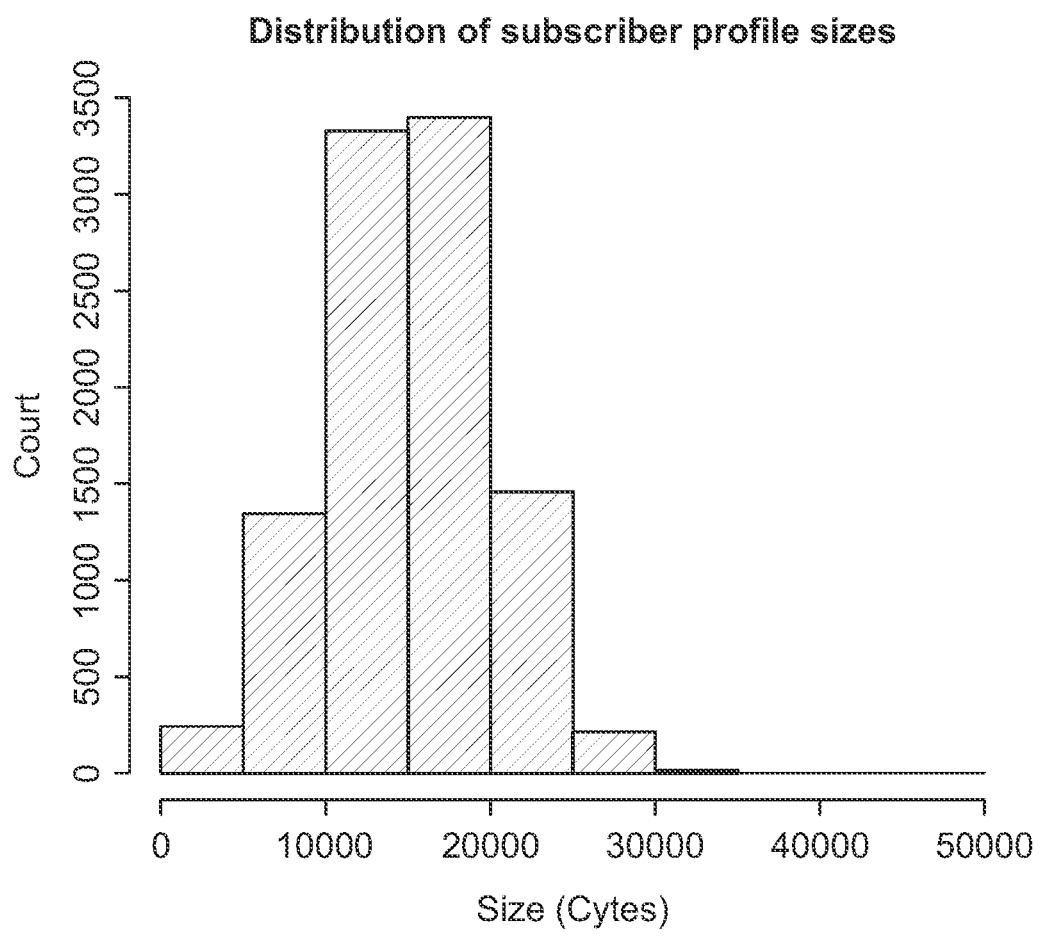
FIG. 1 illustrates a histogram of a collected subscriber profile size distribution, according to certain example embodiments.

It will be readily understood that the components of certain example embodiments, as generally described and illustrated in the figures herein, may be arranged and designed in a wide variety of different configurations. The, the following detailed description of some example embodiments of systems, methods, apparatuses, and computer program products may be for mitigating problems in subscriber profile management. This is not intended to limit the scope of certain example embodiments, but is representative of some example embodiments.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or steps discussed below may be performed in a different order and/or concurrently with each other. Furthermore, if desired, one or more of the described functions or steps may be optional or may be combined. As such, the following description should be considered as merely illustrative of the principles and teachings of certain example embodiments, and not in limitation thereof.

When a user signs a contract with a network operator (e.g., buys a subscriber identification module (SIM)), the network operator performs provisioning, which creates a subscriber profile with data reflecting details of the SIM and associated services. The subscriber profile may include static data and dynamic data.

Static data may be created during the initial provisioning, and may contain various types of data. For instance, the static data may include international mobile subscriber identity (IMSI), mobile station international subscriber directory number, IP multimedia public identity (IMPU), IP multimedia private identity (IMPI), service profile, charging information, static access point name (APN), and others. On the other hand, dynamic data may be created during call processing, and may include data such as repository data, dynamic APNs, notifications, monitoring events, communication patterns, and others.

In certain cases, dynamic data in the subscriber profile may grow significantly over time. For example, additional dynamic data may be induced by network functions (NFs) such as unified data management (UDM) due to roaming conditions (e.g., new repository data reflecting supplementary services during roaming). Further, dynamic data may be expanded when reference provisioned data (common data) is dereferenced. In addition, new dynamic data may be added when new features are turned on. For example, this may be due to $3^{rd}$ Generation Partnership Project (3GPP) evolutions or vendor specific implementations that introduce new containers in service based interface (SBI) message payload.

As noted, the subscriber profiles may grow over time. The growth of subscriber profiles may result in growth of corresponding protocol payload, which often remains unnoticed until it degrades the system performance (e.g., planned system dimensioning is exceeded), and leads to service impact. In certain cases, investigation problems related to subscriber profile sizes and non-optimized profile planning may occur. For instance, such problems may involve parsing large amounts of positioning calculation application parts (PCAPs) manually, and searching for the unexpected size of Cx-server-assignment-answer (SAA) messages. Thus, this may increase serviceability cost and the debugging complexity. In addition, similar scenarios may also impact SBI (e.g., eIMS SBI between call session control function (CSCF) and home subscriber server (HSS)). Accordingly, certain example embodiments may address the above-described situations via automated profile size monitoring in a standardized way.

Table 1 shows a summary of how the subscriber profile may be organized. In particular, Table 1 shows the dynamic and static parts of the subscriber profile, and corresponding entities that may update the profile.

TABLE 1

| Organization of subscriber profile | | |
|---|---|---|
| UE-Profile Object Class and attribute | Nature | Entity that may update the profile |
| IMPU, IMPI, MSISDN, IMSI | Static | Provisioning interface such as CRM system |
| hssAliasRepData.data | Dynamic | Application Servers |
| hssNotification | Dynamic | Application Servers |
| globalFilterIds | Run time reference resolution | Provisioning interface such as CRM system |
| dynPdnInfo | Dynamic | MME or AAA |

In certain cases, during the transaction processing, the NFs may push data into a subscriber profile, which is also known as a user equipment (UE) profile. As a result, another NF (including the provisioning element) reading the profile may experience delays when the subscriber profile grows. Accordingly, unnoticed growth of subscription data (subscriber profiles) may lead to message fragmentation, which in turn, may cause increased response times ultimately impacting service. Moreover, an application server (AS) may intentionally or unintentionally (e.g., due to sub-optimal implementation) push significant amounts of data to the subscription, causing uncontrolled growth of subscriber profiles leading to negative service impact and network outages. Thus, without a solution in place, the network may be susceptible to malicious attacks, which can remain unnoticed until a network outage occurs.

In view of the problems that may occur as a result of the growth of subscriber profiles, certain example embodiments may provide a method to monitor the subscriber profile size dynamics at runtime, and mitigate potential network-wide problems before they occur. For instance, certain example embodiments may provide a standardized performance management (PM) measurement that keeps track of the statistical distribution of subscriber profile sizes at the UDM. The observed distribution may be periodically reported to analytics where the change trends may be derived and provided as insight to the decision logic where necessary correction/mitigation actions may be identified. In certain example embodiments, the overall process may follow an observe-orient-decide-act (OODA) control loop pattern. Thus, according to certain example embodiments, PM measurement in combination with the analysis and corrective actions in UDM transaction processing or provisioning may provide solutions needed to address issues with subscriber profile size. Moreover, certain example embodiments may provide preventive mitigation of network outages, offer network operator insight on the subscriber profile dynamics, and enable optimal planning of the network resources such as network bandwidth, CPU, and memory.

Certain example embodiments may provide a standardized performance measurement focusing on monitoring the statistical distribution (e.g., sizes) of service profiles stored by a unified data repository (UDR), and handled by UDM. In addition, statistical distribution of corresponding messages exchanged by NFs over signaling interfaces may be monitored. Further, certain example embodiments may generate a histogram representing the number of service profile sizes observed during a granularity period (GP) falling into particular pre-defined intervals. For example, the count of observed service profile sizes within certain intervals may be captured as a bin value. In certain example embodiments, the histogram may be generated by a network data analytics function (NWDAF), management function (MF), management analytics function, management system, self-organizing network (SON) server, or SON function. According to certain example embodiments, with this approach, it may be possible to combine the level of detail necessary to understand the situation with efficient data collection where just a brief summary may need to be collected and stored for future analysis.

Figure 2A:
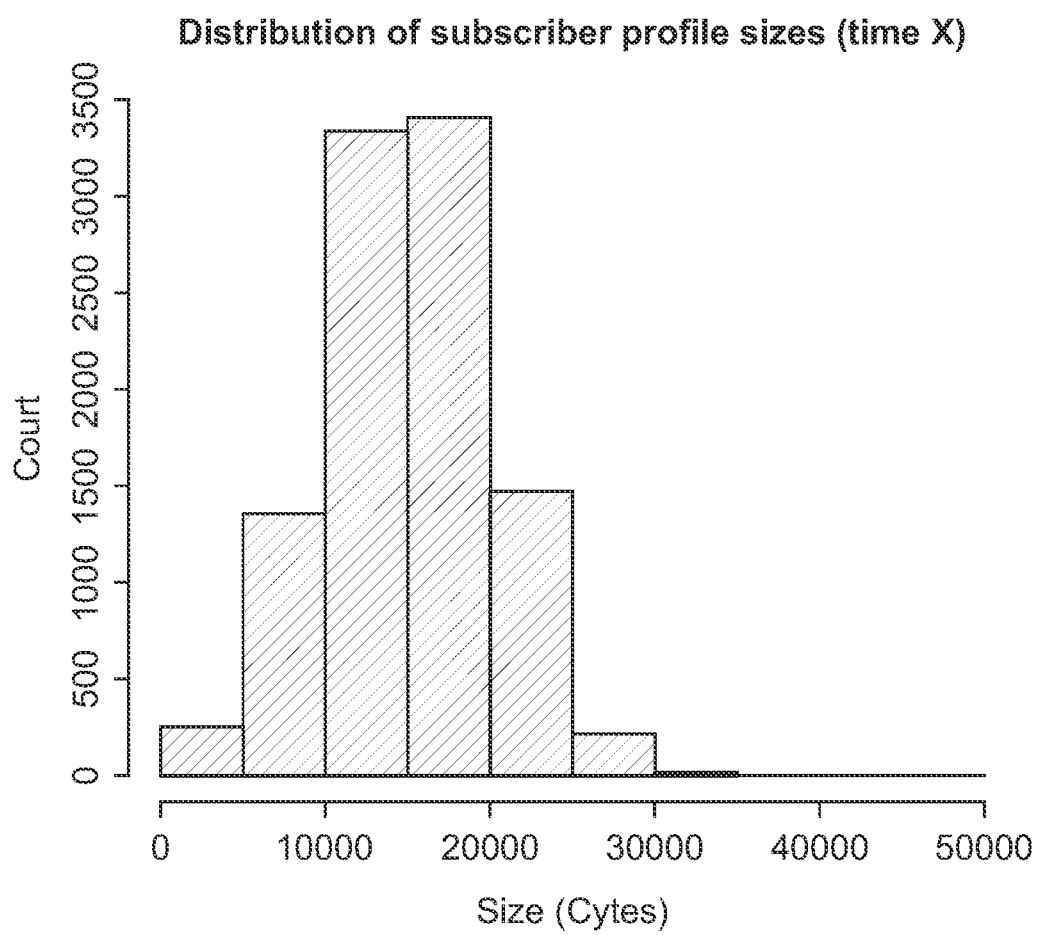
FIG. 2(a) illustrates a histogram of a collected subscriber profile size distribution at time "X", according to certain example embodiments.
Figure 2B:
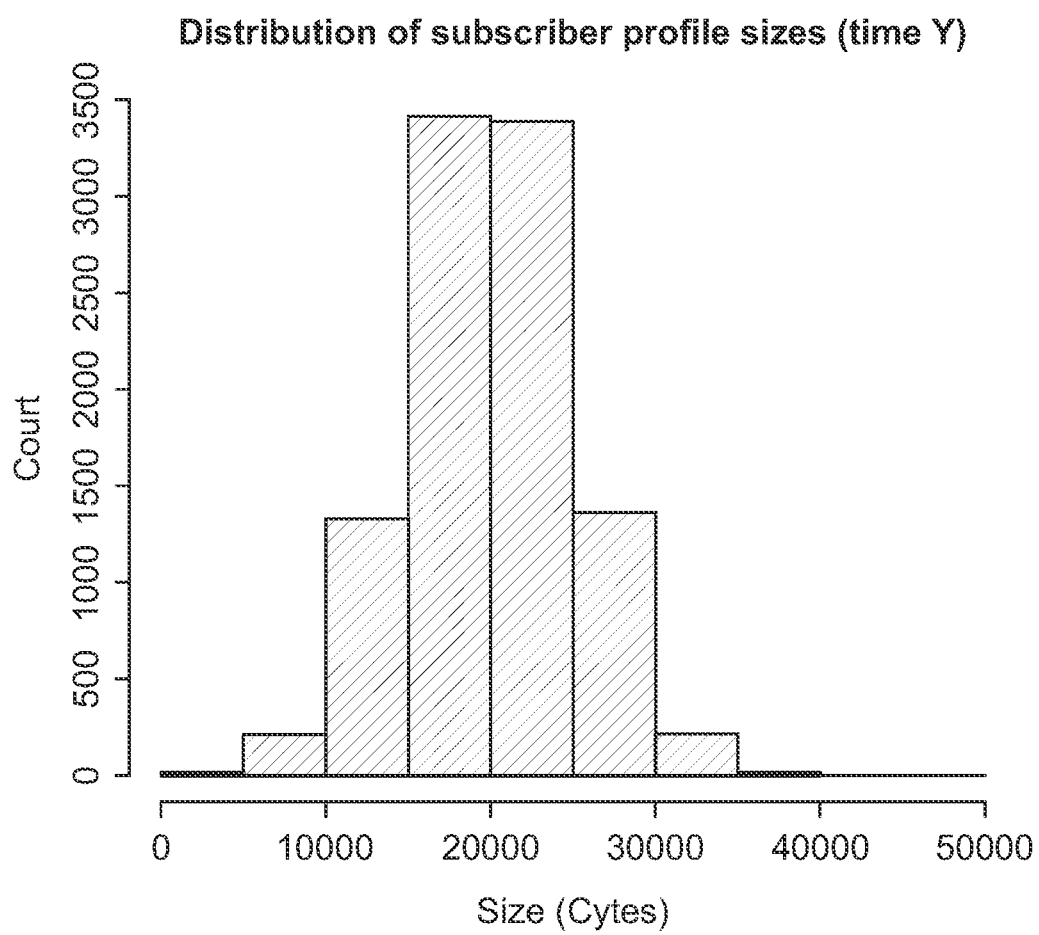
FIG. 2(b) illustrates a histogram of the collected subscriber profile size distribution at time "Y", according to certain example embodiments.
Figure 2C:
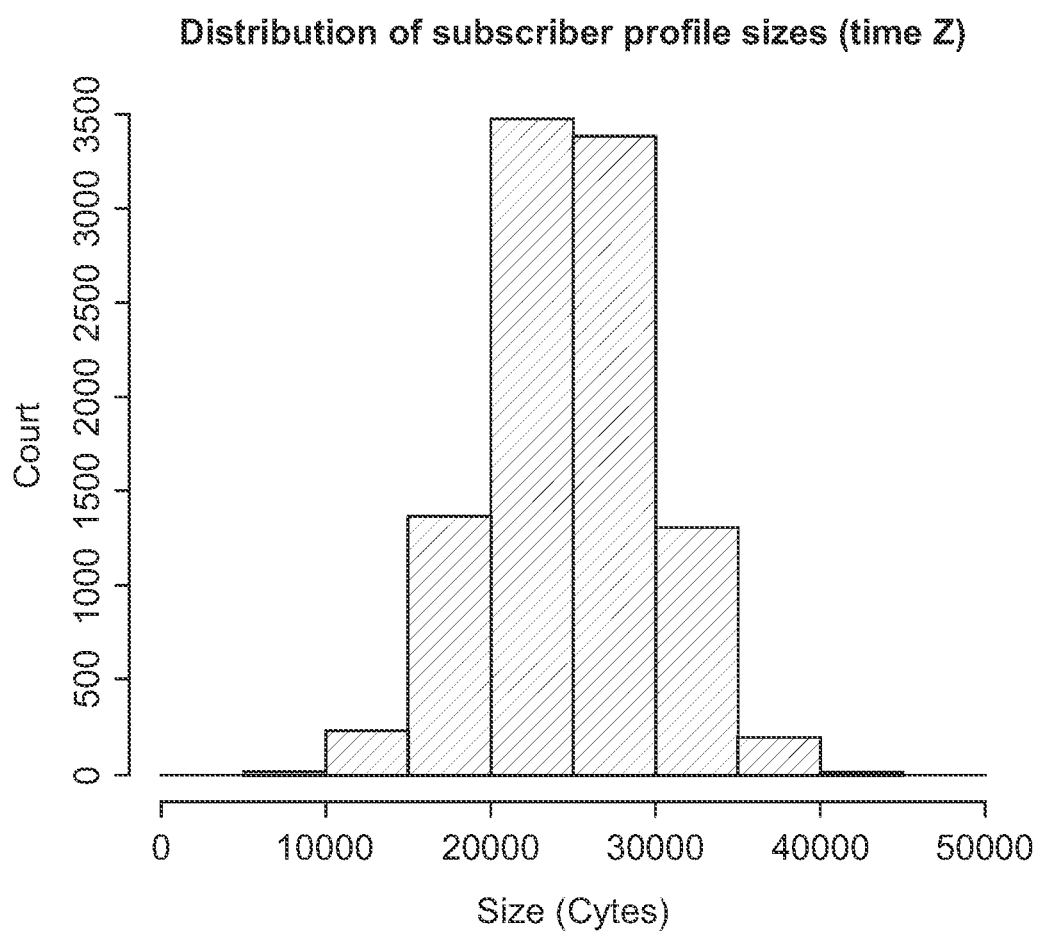
FIG. 2(c) illustrates a histogram of the collected subscriber profile size distribution at time "Z", according to certain example embodiments.

FIG. 1 illustrates a histogram of a collected subscriber profile size distribution, according to certain example embodiments. In certain example embodiments, a change in the distribution of collected subscriber profile size through time may also be observed. For example, FIG. 2(a) illustrates a histogram of a collected subscriber profile size distribution at time "X", according to certain example embodiments. Further, FIG. 2(b) illustrates a histogram of the collected subscriber profile size distribution at time "Y", according to certain example embodiments. In addition, FIG. 2(c) illustrates a histogram of the collected subscriber profile size distribution at time "Z", according to certain example embodiments. In other example embodiments, single value measurements representing a mean or median size of observed service profiles (and/or signalling messages) during GP may also be possible.

As noted herein, subscriber profile sizes may be measured to provide a distribution of subscriber profile sizes in UDM. For instance, in certain example embodiments, the measurement may be obtained by determining the size of each subscriber profile. According to certain example embodiments, the subscriber profile size may be reported by a network function including, for example, the UDM, as a performance measurement. In certain example embodiments, the network function may determine the size, and the periodic reporting of the size(s) may be the responsibility of the network function itself, or a management function in charge of the network function. In addition, a bin with a range corresponding to the observed service profile size may be selected, and the value of the counter for the selected bin may be incremented by 1. For example, for an observed subscriber profile size of 3,300 bytes, the counter corresponding to the bin "0-5000" may be incremented by one.

According to certain example embodiments, each measurement may be an integer representing the count of service profiles with a size within the range of the bin. For example, a reported distribution may be represented as RM.SubscriberProfileSizesCount.Bin, where Bin indicates the size range that may be vendor specific. In certain example embodiments, the Bin values may be, for example: 0.0-5000=243, 0.5001-10000=1343, 0.10001-15000=3330, 0.15001-20000=3391, 0.20001-25000=1462, 0.25001-30000=215, or 0.30001-35000=16.

In certain example embodiments, it may be possible to measure message sizes. According to certain example embodiments, the message size may be measured by a network function including, for example, the UDM itself, an intermediate note (e.g., a router signaling gateway), or a probe monitoring signaling traffic. The message size may provide a distribution of message sizes in UDM, such as UDM SubscriberDataManagement. For example, a measurement of diameter-extensible authentication protocol (EAP)-request (DER) may be n=1. This measurement may be obtained for each observed UDM_SubscriberDataManagement response or notification message (e.g., "SDM Get Response", "SDM Notification Notify", "SDM Info Response"), and its size may be determined. According to certain example embodiments, the bin with the range corresponding to the observed message size may be selected under a sub-counter corresponding to the message type, and each value of the counter for the selected bin may be incremented by 1. For example, for an observed "SDM Get Response" message with a size of 4,500 bytes, the counter corresponding to the bin "0-5000" may be incremented by one.

According to certain example embodiments, each measurement of the message may be an integer representing the count of service profiles with a size within the range of the bin. For example, the Bin in RM.UdmSdm.GetResponseSize.Bin indicates the size range which may be vendor specific. Further, Bin in RM.UdmSdm.NotificationSize.Bin may indicate the size range which may be vendor specific. In addition, Bin in RM.UdmSdm.InfoResponseSize.Bin may indicate the size range which may be vendor specific.

In certain example embodiments, once the size distribution of the profiles and/or messages has been collected, an analysis of the periodically reported subscriber profile size and/or message size distribution may be performed. According to certain example embodiments, this analysis may identify trends or changes in the distribution. For example, FIGS. 2(a)-2(c) illustrate a distribution of subscriber profile size changes over time with steady growth from observation at time "X", time "Y", and time "Z".

According to certain example embodiments, the detected trend (e.g., result of the analysis) may be used to identify one or more possible corrective actions that may or may not be needed to mitigate the detected trend. In certain example embodiments, the corrective actions may correspond to changes in configuration of a particular application function. Another type of corrective action may include compacting (e.g., cleaning) the subscriber profile, which may be applied to a certain number of subscriber profiles (e.g., according to a pre-defined criterion such as profile size threshold). Once the available corrective action(s) has been identified, a decision may be made as to whether or not one or more of the corrective actions is needed. If it is determined that corrective action is needed, one or more corrective actions may be applied to the network. Upon completing the corrective action, network behavior may continue to be observed, and the subscriber profile sizes and distributions may periodically be collected.

Figure 3:
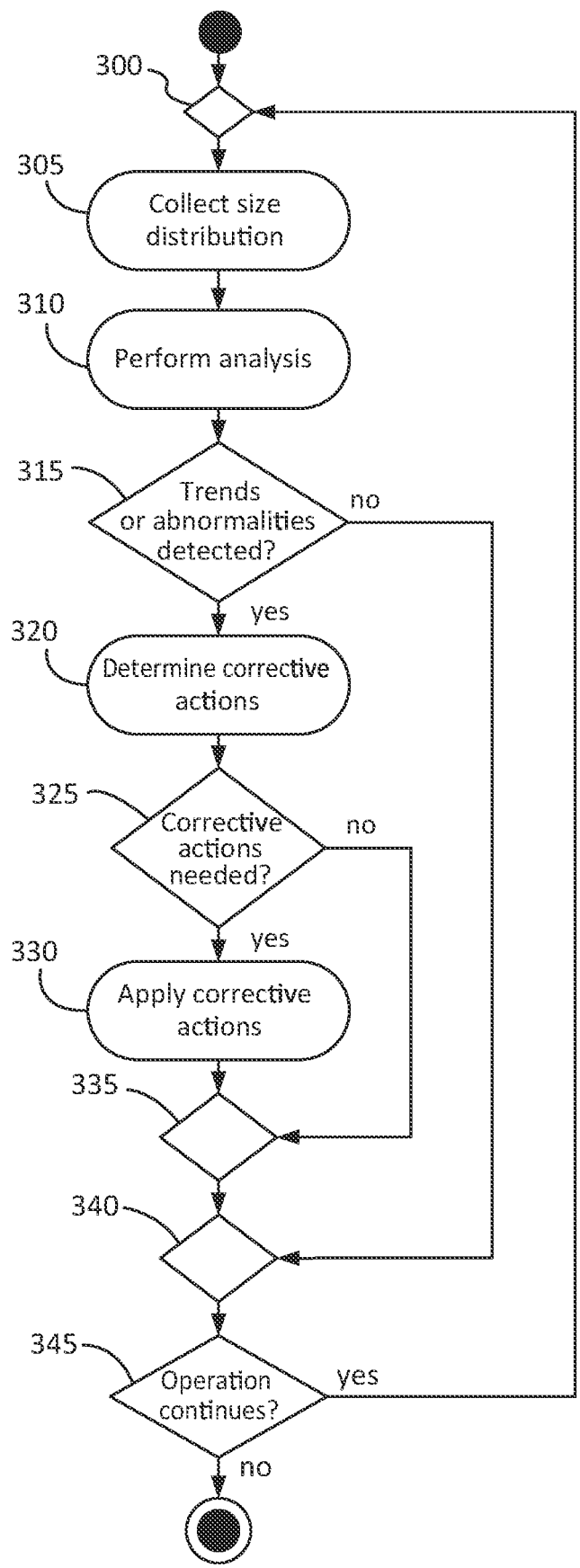
FIG. 3 a flow diagram of a method, according to certain example embodiments.

FIG. 3 illustrates a flow diagram of a method, according to certain example embodiments. In certain example embodiments, the flow diagram of FIG. 3 may be performed by a self-managing UDM (where the steps of the method may be performed by a management function integrated with UDM), a management system, or multiple management functions performing individual steps cooperatively, for instance similar to apparatus 20 illustrated in FIG. 5(b). For example, at 300, the method may include a repeated execution point of the method, which occurs after determining that the operation continues at 345, and that the method repeats again at 305. At 305, the method may include collecting size distributions of profiles and/or messages. According to certain example embodiments, prior to collecting the size distributions, the method may include creating a distribution of subscriber profile sizes. With the size distributions, the method may include, at 310, analyzing the size distributions to identify any trends. If no trends are identified, the method may proceed to a merging point 340 at which time the method proceeds to 345. However, if one or more trends are identified, at 320, one or more potential corrective actions may be identified. The method may also include, at 325, determining whether any correction action is needed. If no corrective action is needed, the method may proceed to merging point 335 at which time the method proceeds to 345. However, if it is determined that corrective action is needed, then at 330, the method may include applying one or more corrective actions to the network. According to certain example embodiments, the corrective action may include changing the configuration of a particular application function. At 345, if it is determined that operation should continue, the method may return to 300 to continue to observe the network behavior.

In certain example embodiments, a pre-defined threshold may be used for determining whether a corrective action is needed at 325. For example, in some example embodiments, the pre-defined threshold may correspond to whether particular the subscriber profile size or message size exceeds a mean size. However, in other example embodiments, a detected trend (e.g., that size distribution shifts to the right or changes its shape) may be used as well. In certain example embodiments, the decision may be based on a prediction (e.g., based on a linear regression or any other method), and the corrective action performed according to the prediction may include a pre-emptive action.

According to certain example embodiments, creating the distribution may include collecting single value measurements of subscriber profile sizes, and reporting numbers of subscriber profile sizes falling within each of a plurality of pre-determined size ranges. In certain example embodiments, creating the distribution may include collecting single value measurements of subscriber profile sizes and computing a mean or median value of the subscriber profile sizes. According to other example embodiments, the method may further include creating a distribution of subscriber message sizes observed within the pre-defined interval of the network. In certain example embodiments, the analysis may include identifying trends in the distribution, or abnormalities in the distribution. In some example embodiments, determining whether the corrective action is needed may include identifying a misbehaving application function, identifying a need for subscriber profile optimization, or identifying a need for life cycle management actions of application function instances and network slices. In other example embodiments, the trends in the distribution may include change of the subscriber profile sizes, or change of a count of subscriber profiles. According to certain example embodiments, the corrective action may include re-configuring an application function of the network, removing unnecessary data from a subscriber profile, eliminating unused services information from the subscriber profile, dynamically compressing data in the subscriber profile, dynamically moving the data to a shared profile, or performing life cycle management actions at the application function or network slice level.

Figure 4:
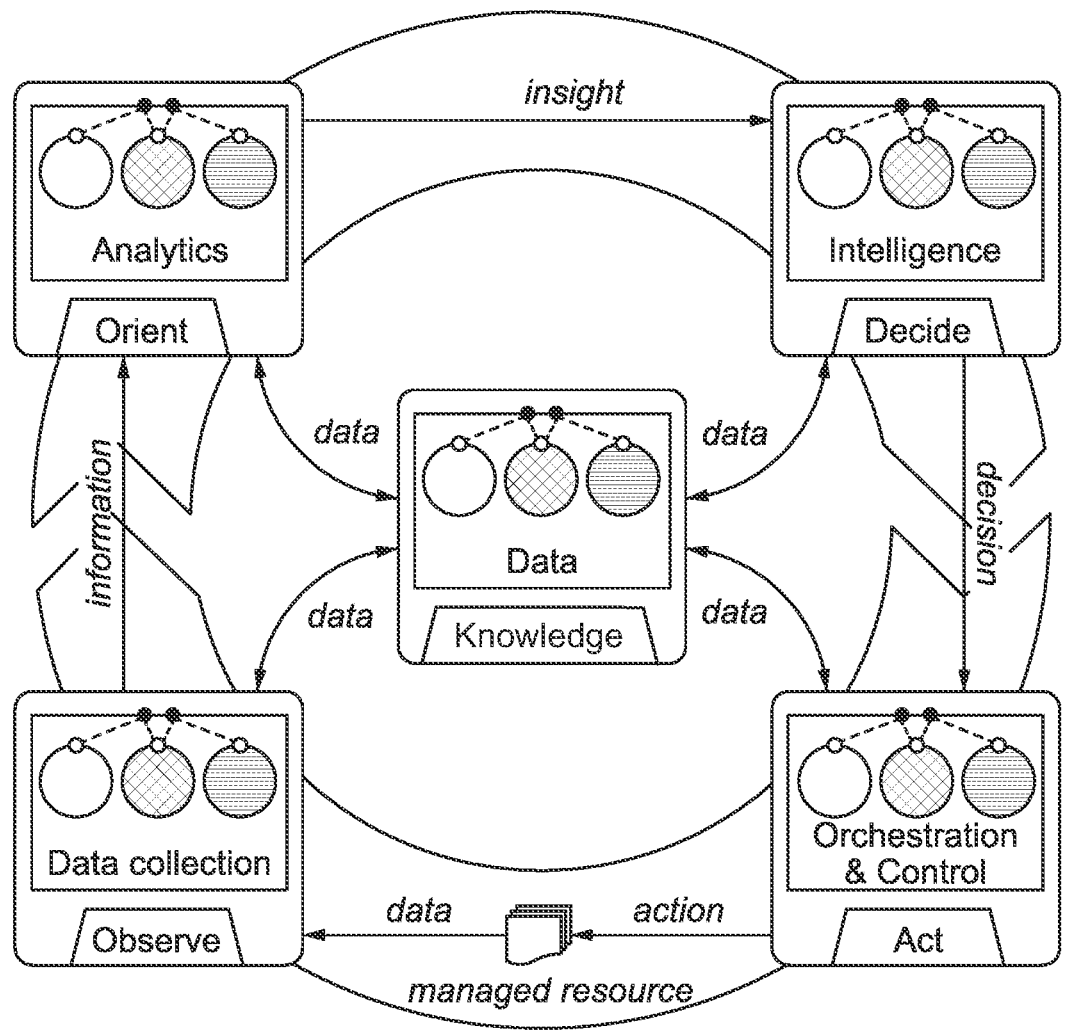
FIG. 4 illustrates an observe-orient-decide-act (OODA) control loop, according to certain example embodiments.
Figure 4:
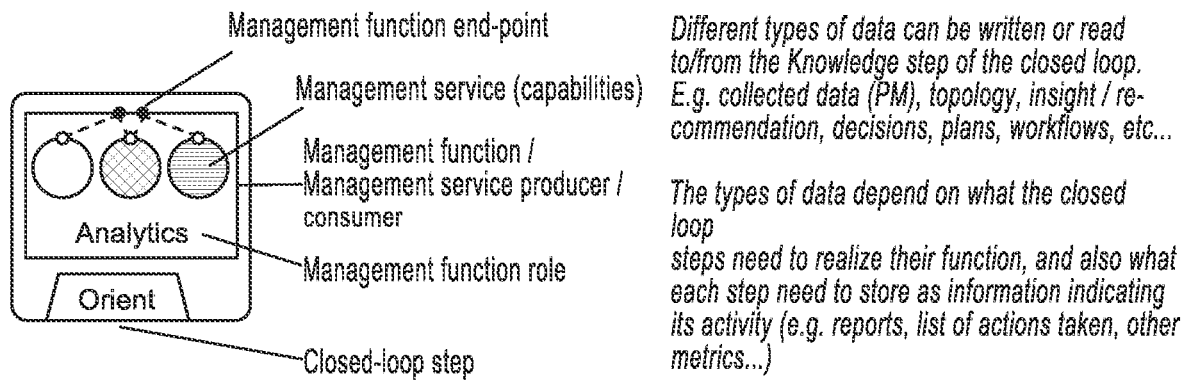

FIG. 4 illustrates an OODA control loop, according to certain example embodiments. In the observe step illustrated in FIG. 4, new subscriber profile size distribution measurements may be collected by the method described above. According to certain example embodiments, additional new measurements in this step may include message size distributions. In certain example embodiments, the measurements may be for 5G related to UDM (e.g., Nudm_Subscriber-DataManagement, Nudm_EventExposure, Nudm_ParameterProvision), SBI based HSS (e.g., Nhss_SubscriberData-Management), eIMS for HSS (e.g., Nhss_imsSubscriberDataManagement), and Nudr (e.g., Nudr_DataRepository Data retrieval and Data updates, Nudr_GroupIDmap). In other example embodiments, the measurements may be for legacy LTE/VoLTE for HSS related to various signaling interfaces including, for example, Cx (e.g., Cx-SAA, Cx-PPR), Sh (e.g., Sh-UDR, PUR, SNR, Sh-PNR), S6a (e.g., S6a-ULR/ULA, S6a-IDR), and S6t (e.g., external group related data for monitoring events/communication patterns when the group expands for IoT).

As further illustrated in FIG. 4, the orient step may include two different types of analysis. In certain example embodiments, one analysis may include detection of abnormalities, which may include non-zero values reported in size bins previously containing zero values. In other example embodiments, the analysis may include detection of change trends, which may include trends related to growth, as illustrated in FIG. 2(a)-2(c).

FIG. 4 further illustrates a decide step, which may include certain potential corrective decisions. For example, in certain example embodiments, the decide step may include identifying "misbehaving" NF (e.g., application functions), identifying the need for subscriber profile optimization, and identify the need for life cycle management (LCM) actions (e.g., scale) of NF instances and network slices.

Furthermore, FIG. 4 illustrates an act step that may include potential corrective actions. In certain example embodiments, the act step may include applying configuration changes to identified NFs (e.g., re-configure application function). In other example embodiments, the act step may include certain possible corrective actions such as, for example, applying subscriber profile optimization, which may include removing unnecessary data, eliminating unused services information, dynamically compressing the data, and/or moving the data to a shared profile. According to further example embodiments, the act step may include performing LCM actions at the NF (e.g., scale-in/scaled-out) or network slice level (e.g., instantiate new NFs or modify load-balancing policies).

Figure 5A:
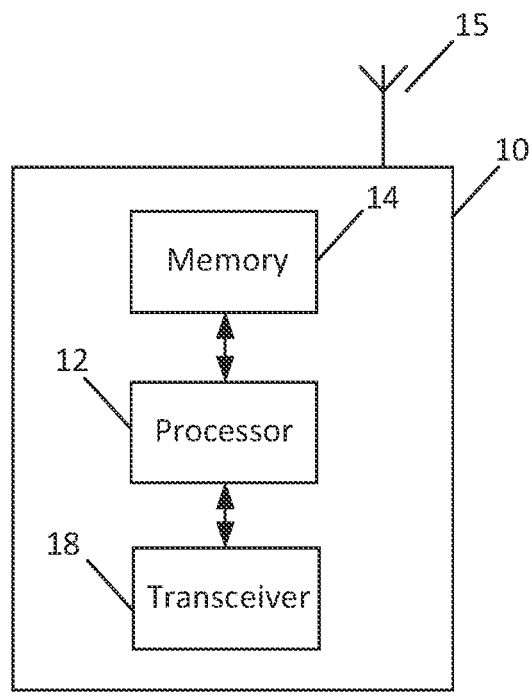
FIG. 5(a) illustrates an example block diagram of an apparatus, according to an embodiment.

FIG. 5(a) illustrates an apparatus 10, according to certain example embodiments. In certain example embodiments, apparatus 10 may be a node or element in a communications network or associated with such a network, such as a UE, mobile equipment (ME), mobile station, mobile device, stationary device, IoT device, or other device. As described herein, UE may alternatively be referred to as, for example, a mobile station, mobile equipment, mobile unit, mobile device, user device, subscriber station, wireless terminal, tablet, smart phone, IoT device, sensor or NB-IoT device, or the like. As one example, apparatus 10 may be implemented in, for instance, a wireless handheld device, a wireless plug-in accessory, or the like.

In certain example embodiments, apparatus 10 may include one or more processors, one or more computer-readable storage medium (for example, memory, storage, or the like), one or more radio access components (for example, a modem, a transceiver, or the like), and/or a user interface. In some example embodiments, apparatus 10 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 10 may include components or features not shown in FIG. 5(a).

As illustrated in the example of FIG. 5(a), apparatus 10 may include or be coupled to a processor 12 for processing information and executing instructions or operations. Processor 12 may be any type of general or specific purpose processor. In particular, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 5(a), multiple processors may be utilized according to other example embodiments. For example, it should be understood that, in certain example embodiments, apparatus 10 may include two or more processors that may form a multiprocessor system (e.g., in this case processor 12 may represent a multiprocessor) that may support multiprocessing. According to certain example embodiments, the multiprocessor system may be tightly coupled or loosely coupled (e.g., to form a computer cluster).

Processor 12 may perform functions associated with the operation of apparatus 10 including, as some examples, precoding of antenna gain/phase parameters, encoding and decoding of individual bits forming a communication message, formatting of information, and overall control of the apparatus 10, including processes illustrated in FIGS. 1-4.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In certain example embodiments, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10 to perform any of the methods illustrated in FIGS. 1-4.

In certain example embodiments, apparatus 10 may also include or be coupled to one or more antennas 15 for receiving a downlink signal and for transmitting via an uplink from apparatus 10. Apparatus 10 may further include a transceiver 18 configured to transmit and receive information. The transceiver 18 may also include a radio interface (e.g., a modem) coupled to the antenna 15. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 18 may be configured to modulate information on to a carrier waveform for transmission by the antenna(s) 15 and demodulate information received via the antenna(s) 15 for further processing by other elements of apparatus 10. In other example embodiments, transceiver 18 may be capable of transmitting and receiving signals or data directly. Additionally or alternatively, in certain example embodiments, apparatus 10 may include an input and/or output device (I/O device). In certain example embodiments, apparatus 10 may further include a user interface, such as a graphical user interface or touchscreen.

In certain example embodiments, memory 14 stores software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software. According to certain example embodiments, apparatus 10 may optionally be configured to communicate with apparatus 20 via a wireless or wired communications link 70 according to any radio access technology, such as NR.

According to certain example embodiments, processor 12 and memory 14 may be included in or may form a part of processing circuitry or control circuitry. In addition, in some embodiments, transceiver 18 may be included in or may form a part of transceiving circuitry.

Figure 5B:
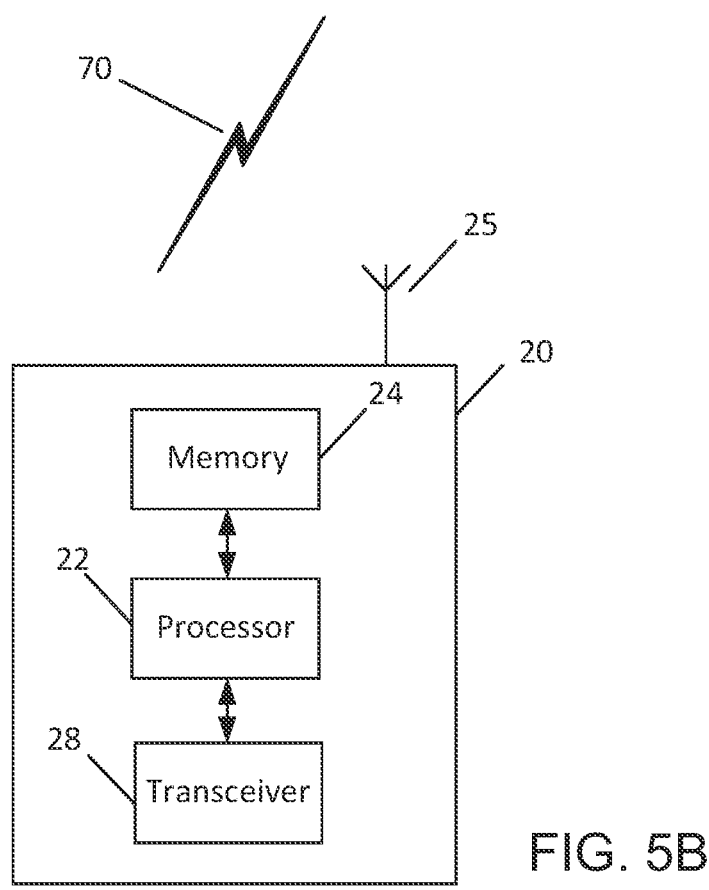
FIG. 5(b) illustrates an example block diagram of another apparatus, according to an example embodiment.

FIG. 5(b) illustrates an apparatus 20, according to certain example embodiments. In an example embodiment, the apparatus 20 may be a network element, node, host, or server in a communication network or serving such a network. For example, apparatus 20 may be a base station, a Node B, an evolved Node B (eNB), 5G Node B or access point, next generation Node B (NG-NB or gNB), AMF, SMF, PCF, NEF, AF, UDM, WLAN access point, and/or a collection of any combination of such elements, associated with a radio access network (RAN), such as an LTE network, 5G or NR. It should be noted that one of ordinary skill in the art would understand that apparatus 20 may include components or features not shown in FIG. 5(b).

As illustrated in the example of FIG. 5(b), apparatus 20 may include a processor 22 for processing information and executing instructions or operations. Processor 22 may be any type of general or specific purpose processor. For example, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 5(b), multiple processors may be utilized according to other embodiments. For example, it should be understood that, in certain example embodiments, apparatus 20 may include two or more processors that may form a multiprocessor system (e.g., in this case processor 22 may represent a multiprocessor) that may support multiprocessing. In certain example embodiments, the multiprocessor system may be tightly coupled or loosely coupled (e.g., to form a computer cluster.

According to certain example embodiments, processor 22 may perform functions associated with the operation of apparatus 20, which may include, for example, precoding of antenna gain/phase parameters, encoding and decoding of individual bits forming a communication message, formatting of information, and overall control of the apparatus 20, including processes illustrated in FIGS. 1-4.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In certain example embodiments, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20 to perform the methods illustrated in FIGS. 1-4.

In certain example embodiments, apparatus 20 may also include or be coupled to one or more antennas 25 for transmitting and receiving signals and/or data to and from apparatus 20. Apparatus 20 may further include or be coupled to a transceiver 28 configured to transmit and receive information. The transceiver 28 may include, for example, a plurality of radio interfaces that may be coupled to the antenna(s) 25. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 28 may be configured to modulate information on to a carrier waveform for transmission by the antenna(s) 25 and demodulate information received via the antenna(s) 25 for further processing by other elements of apparatus 20. In other example embodiments, transceiver 18 may be capable of transmitting and receiving signals or data directly. Additionally or alternatively, in certain example embodiments, apparatus 20 may include an input and/or output device (I/O device).

In certain example embodiments, memory 24 may store software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to certain example embodiments, processor 22 and memory 24 may be included in or may form a part of processing circuitry or control circuitry. In addition, in certain example embodiments, transceiver 28 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10 and 20) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain example embodiments, apparatus 20 may be a network element, node, host, or server in a communication network or serving such a network. For example, apparatus 20 may be a base station, a Node B, an evolved Node B (eNB), 5G Node B or access point, next generation Node B (NG-NB or gNB), AMF, SMF, PCF, NEF, AF, WLAN access point, and/or a collection of any combination of such elements, associated with a radio access network (RAN), such as an LTE network, 5G or NR. According to certain embodiments, apparatus 20 may be controlled by memory 24 and processor 22 to perform the functions associated with any of the embodiments described herein.

For instance, in certain example embodiments, apparatus 20 may be controlled by memory 24 and processor 22 to collect a distribution of subscriber profile sizes observed within a pre-defined interval of a network. Apparatus 20 may also be controlled by memory 24 and processor 22 to perform an analysis of the distribution. Apparatus 20 may further be controlled by memory 24 and processor 22 to determine a corrective action based on the analysis. In addition, apparatus 20 may be controlled by memory 24 and processor 22 to determine whether the corrective action is needed. When it is determined that the corrective action is needed, apparatus 20 may be controlled by memory 24 and processor 22 to apply the corrective action to the network. When it is determined that the corrective action is not needed, apparatus 20 may be controlled by memory 24 and processor 22 to collect another distribution of subscriber profile sizes.

Further example embodiments may provide means for performing any of the functions, steps, or procedures described herein. For example, certain example embodiments may be directed to an apparatus that includes means for collecting a distribution of subscriber profile sizes observed within a pre-defined interval of a network. The apparatus may also include means for performing an analysis of the distribution. The apparatus may further include means for determining a corrective action based on the analysis. Further, the apparatus may include means for determining whether the corrective action is needed. When it is determined that the corrective action is needed, the apparatus may include means for applying the corrective action to the network. When it is determined that the corrective action is not needed, the apparatus may include means for collecting another distribution of subscriber profile sizes.

Certain example embodiments described herein provide several technical improvements, enhancements, and/or advantages over existing technological processes and constitute an improvement at least to the technological field of mitigating problems in subscriber profile management. In some example embodiments, it may be possible to monitor the subscriber profile size dynamics at runtime and mitigate potential network-wide problems before they occur. It may also be possible to keep track of the statistical distribution of subscriber profile sizes at the UDM. In addition, it may be possible to periodically report the observed distribution to analytics where the change trends may be derived and provided as insight to the decision logic where necessary correction/mitigation actions are identified. According to other example embodiments, it may be possible to offer network operators insight on the subscriber profile dynamics, and enable optimal planning of network resources such as network bandwidth, CPU, and memory.

A computer program product may comprise one or more computer-executable components which, when the program is run, are configured to carry out some of the various example embodiments described herein. The one or more computer-executable components may be at least one software code or portions of it. Modifications and configurations required for implementing functionality of an example embodiment may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the example embodiments as discussed above may be practiced with steps in a different order, and/or with hardware elements in configurations which are different than those which are disclosed. Therefore, although some embodiments have been described based upon these example preferred embodiments, it would be apparent to those of skill in the art that certain modifications, variations, and alternative constructions would be apparent, while remaining within the spirit and scope of example embodiments. In order to determine the metes and bounds of the example embodiments, therefore, reference should be made to the appended claims.

Partial Glossary

5GS 5G System
5SI 5G Synchronization Identifier
AMF Access and Mobility Function
BS Base Station
eIMS Enhanced IMS
eNB Enhanced Node B
gNB 5G or NR Base Station
HSS Home Subscriber Server
IMS IP Multimedia Subsystem
LTE Long Term Evolution NEF Network Exposure Function
NF Network Function
NR New Radio
NWDAF Network Data Analytics Function
OODA Observe Orient Decide Act
PDU Protocol Data Unit
SDM Subscriber Data Management
SMF Session Management Function
UDICOM User Data Interworking, Coexistence and Migration
UDM Unified Data Management
UDR Unified Data Repository
UE User Equipment
UECM UE Context Management
URLCC Ultra-Reliable and Low Latency Communications

We claim:

1. A method, comprising:
   determining, in a core network, sizes of subscriber profiles associated with a plurality of subscribers;
   creating a first distribution of the sizes of the subscriber profiles based on the determining;
   performing an analysis of based on a plurality of distributions of the sizes of the subscriber profiles, the plurality of distributions including the first distribution, each distribution of the plurality of distributions identifying one or more bins and respective values associated with respective bins of the one or more bins, respective bins of the one or more bins of each distribution associated with a respective range of size of the subscriber profiles;
   determining a corrective action based on the analysis;
   determining the corrective action is needed; and
   applying the corrective action to the core network, wherein the applying the corrective action comprises at least one of the following:
   re-configuring an application function of the core network;
   removing data from a subscriber profile of the subscriber profiles;
   eliminating unused services information from the subscriber profile;
   dynamically compressing data in the subscriber profile;
   dynamically moving data in the subscriber profile to a shared profile; or
   performing life cycle management actions at the network slice level.

2. The method according to claim 1, wherein the creating the first distribution of the sizes of the subscriber profiles comprises:
   for each respective subscriber of the plurality of subscribers, incrementing a value of a first counter of a bin of the one or more bins that corresponds to
   a respective size of the respective subscriber profile for the respective subscriber.

3. The method according to claim 1, wherein the creating the distribution comprises:
   collecting single value measurements of the sizes of the subscriber profiles; and
   reporting numbers of the sizes of the subscriber profiles falling within each of a plurality of pre-determined size ranges.

4. The method according to claim 1, wherein the creating the distribution comprises:
   collecting single value measurements of the sizes of the subscriber profiles; and
   computing a mean or median value of the sizes of the subscriber profiles.

5. The method according to claim 1, wherein the determining the corrective action is needed comprises:
   identifying a misbehaving application function;
   identifying a need for optimization of the subscriber profiles; or
   identifying a need for life cycle management actions of network slices.

6. An apparatus for a core network, the apparatus comprising:
   at least one processor; and
   at least one memory comprising computer program code, the at least one memory and the computer program code being configured to, when executed by the at least one processor, to cause the apparatus at least to perform:
   determining subscriber profile sizes associated with a plurality of subscribers;
   creating a first distribution of the sizes of the subscriber profiles based on the determining;
   performing an analysis of based on a plurality of distributions of the sizes of the subscriber profiles, the plurality of distributions including the first distribution, each distribution of the plurality of distributions identifying one or more bins and respective values associated with respective bins of the one or more bins, respective bins of the one or more bins of each distribution associated with a respective range of size the subscriber profiles;
   determining a corrective action based on the analysis;
   determining the corrective action is needed; and
   applying the corrective action to the core network, wherein the applying the corrective action comprises at least one of the following:
   re-configuring an application function of the core network;
   removing data from a subscriber profile of the subscriber profiles;
   eliminating unused services information from the subscriber profile;
   dynamically compressing data in the subscriber profile;
   dynamically moving data in the subscriber profile to a shared profile; or
   performing life cycle management actions at the network slice level.

7. The apparatus according to claim 6, wherein the creating the first distribution of the subscriber profile sizes comprises:
   for each respective subscriber of the plurality of subscribers, incrementing a value of a
   first counter of a bin of the one or more bins that corresponds to a respective size of the respective subscriber profile for the respective subscriber.

8. The apparatus according to claim 6, wherein the creating the distribution comprises:
   collecting single value measurements of the sizes of the subscriber profiles; and
   reporting numbers of the sizes of the subscriber profiles falling within each of a plurality of pre-determined size ranges.

9. The apparatus according to claim 6, wherein the creating the distribution comprises:
   collecting single value measurements of the sizes of the subscriber profiles; and
   computing a mean or median value of the sizes of the subscriber profiles.

10. The apparatus according to claim 6, the determining the corrective action is needed comprises:
- identifying a misbehaving application function;
- identifying a need for optimization of the subscriber profiles; or
- identifying a need for life cycle management actions of network slices.

11. A non-transitory computer readable medium storing encoded instructions which, when executed by a processor, causes the processor to perform:
- determining sizes of subscriber profiles associated with a plurality of subscribers;
- creating a first distribution of the sizes of the subscriber profiles based on the determining;
- performing an analysis based on a plurality of distributions of the sizes of the subscriber profiles, the plurality of distributions including the first distribution, each distribution of the plurality of distributions identifying one or more bins and respective values associated with respective bins of the one or more bins, respective bins of the one or more bins of each distribution associated with a respective range of size of subscriber profiles;
- determining a corrective action based on the analysis;
- determining the corrective action is needed; and
- applying the corrective action to a core network,
- wherein the applying the corrective action comprises at least one of the following:
- re-configuring an application function of the core network;
- removing data from a subscriber profile of the subscriber profiles;
- eliminating unused services information from the subscriber profile;
- dynamically compressing data in the subscriber profile;
- dynamically moving data in the subscriber profile to a shared profile; or
- performing life cycle management actions at the network slice level.

12. The non-transitory computer readable medium according to claim 11, wherein the creating the first distribution of the subscriber profile sizes comprises:
- for each respective subscriber of the plurality of subscribers, incrementing a value of a first counter of a bin of the one or more bins that corresponds to a respective size of the respective subscriber profile for the respective subscriber.

13. The non-transitory computer readable medium according to claim 11, wherein the creating the distribution comprises:
- collecting single value measurements of the sizes of the subscriber profiles; and
- reporting numbers of the sizes of the subscriber profiles falling within each of a plurality of pre-determined size ranges.

14. The non-transitory computer readable medium according to claim 11, wherein the creating the distribution comprises:
- collecting single value measurements of the sizes of the subscriber profiles; and
- computing a mean or median value of the sizes of the subscriber profiles.

15. The non-transitory computer readable medium according to claim 11, wherein the determining whether the corrective action is needed comprises:
- identifying a misbehaving application function;
- identifying a need for optimization of the subscriber profiles; or
- identifying a need for life cycle management actions of network slices.

* * * * *